United States Patent
Takemura et al.

(10) Patent No.: US 6,751,948 B2
(45) Date of Patent: Jun. 22, 2004

(54) DIRECT INJECTION INTERNAL COMBUSTION ENGINE AND CONTROLLING METHOD THEREFOR

(75) Inventors: Jun Takemura, Toyota (JP); Kazuyoshi Nakane, Okazaki (JP); Shigeo Yamamoto, Obu (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/864,529

(22) Filed: May 24, 2001

(65) Prior Publication Data
US 2002/0023431 A1 Feb. 28, 2002

(30) Foreign Application Priority Data
May 24, 2000 (JP) ........................................ 2000-153432

(51) Int. Cl.$^7$ ................................................. F01N 3/00
(52) U.S. Cl. ............................ 60/284; 60/274; 60/276; 60/285
(58) Field of Search ........................... 60/274; 276/284, 276/285; 123/295, 697, 299

(56) References Cited

U.S. PATENT DOCUMENTS

| | | | | |
|---|---|---|---|---|
| 5,482,017 A | * | 1/1996 | Brehob et al. ............... | 123/299 |
| 5,845,492 A | * | 12/1998 | Isobe et al. .................... | 60/284 |
| 5,867,982 A | * | 2/1999 | Tengblad et al. ............. | 60/285 |
| 5,950,419 A | * | 9/1999 | Nishimura et al. ............ | 60/284 |
| 5,967,113 A | * | 10/1999 | Kaneko et al. .............. | 123/295 |
| 5,974,788 A | * | 11/1999 | Hepburn et al. ............... | 60/285 |
| 5,975,046 A | * | 11/1999 | Kaneko et al. ................ | 60/284 |
| 6,058,905 A | * | 5/2000 | Nagaishi et al. ............. | 123/295 |
| 6,141,960 A | * | 11/2000 | Takami et al. ................. | 60/285 |
| 6,212,884 B1 | * | 4/2001 | Ohuchi et al. ................. | 60/284 |
| 6,311,482 B1 | * | 11/2001 | Yamashita .................... | 60/284 |
| 6,318,074 B1 | * | 11/2001 | Nishimura et al. ............ | 60/284 |
| 6,378,297 B1 | * | 4/2002 | Ito et al. ........................ | 60/284 |

* cited by examiner

*Primary Examiner*—Thomas Denion
*Assistant Examiner*—Tu M. Nguyen
(74) *Attorney, Agent, or Firm*—Rossi & Associates

(57) ABSTRACT

A direct injection internal combustion engine includes catalysts for purifying exhaust gases, the catalysts being disposed in an exhaust passage of the engine. A control device controls the engine so as to warm up or activate the catalysts. The control device includes a first control part for controlling the engine with an air-fuel ratio of the engine being set at a value in proximity to a stoichiometric air-fuel ratio, an ignition timing being set at a point after a top dead center and a fuel injection timing being set within a compression stroke, and a second control part for controlling the engine with an air-fuel ratio of the engine being set at a value in proximity to a stoichiometric air-fuel ratio, with an ignition timing being set before a top dead center and a fuel injection timing being set within a compression stroke after the first control part controls the engine. The controlling operation performed by the first control part enables stable after-burning and raises the exhaust temperature. The following controlling operation of the second control part enables CO and $O_2$ to coexist in the exhaust gases and react on the catalysts

13 Claims, 8 Drawing Sheets

DIRECT INJECTION INTERNAL COMBUSTION ENGINE AND CONTROLLING METHOD THEREFOR

BACKGROUND OF THE INVENTION

1. Field of the Invention

The present invention relates generally to a direct injection internal combustion engine, and more particularly to a method of warming up catalysts when the direct injection internal combustion engine is started cold.

2. Description of Related Art

In recent years, a direct injection internal combustion engine, which injects fuel directly into a combustion chamber, has been developed so as to improve both engine output and fuel economy. In such an internal combustion engine, it is desirable to quickly activate catalysts disposed in an exhaust passage and reduce the amount of harmful substances such as unburned HC that is emitted into the air.

For example, an intake port injection internal combustion engine ordinarily retards the ignition timing to a point after a top dead center in order to accelerate the warm-up of the catalysts. For this reason, it can be considered that this method is applied to the direct injection internal combustion engine. In this case, the ignition timing is set at a point after the top dead center in an intake stroke injection because the intake port injection internal combustion engine ordinarily performs a uniform pre-mixed combustion.

The above internal combustion engine, however, is greatly affected by the residual gases due to the decrease in the intake air when the load on the engine is high e.g. while idling. Thus, a combustion reaction cannot be satisfactorily carried out in the pre-mixed combustion caused by the intake stroke injection, and the retardation of the ignition timing as shown in FIG. 10(c) results in unstable combustion. Consequently, as shown in FIGS. 10(a) and 10(b), the combustion variation ratio is increased to make the heat release amount uneven and further, the engine may misfire. The misfire of the engine causes generation of the unburned HC and deterioration of the exhaust gas performance.

To meet the above-mentioned requirement, there has been developed a method (hereinafter referred to as a two-stage combustion) in which a main injection and an additional fuel injection (hereinafter referred to as an additional injection) are performed by making use of such a characteristic that the direct injection internal combustion engine is capable of freely setting a fuel injection timing. In this method, the additional fuel is burned so as to raise the temperature of exhaust gases by the operation of a reaction product resulting from a main combustion caused by the main injection. This contributes to the quick activation of the catalysts.

Since the combustion reaction of the additional fuel is a low-temperature oxidizing reaction that proceeds slowly, however, a part of the fuel injected in the additional injection is exhausted into an exhaust pipe before burning up in the combustion chamber. This necessitates continuing the combustion reaction of the residual fuel in the exhaust pipe in order to reduce the generation of the unburned HC.

To solve this problem, Japanese Patent Provisional Publication No. 11-294157 discloses a direct injection internal combustion engine that has exhaust manifolds having a capacity space for holding exhaust gases and burns the residual fuel in the capacity space of the exhaust manifolds in order to reduce the generation of unburned HC and raise the temperature of the exhaust gases. Although the method disclosed in Japanese Patent Provisional Publication No. 11-294157 enables the quick activation of the catalysts and the reduction in the unburned HC emission, an output from the engine is lowered because it is interfered in the capacity space by the exhaust gases between cylinders. This method is therefore unsuitable for an engine that is required to output high power.

Another method has been proposed which integrates a proximity catalyst with exhaust manifolds so that the proximity catalyst can be provided at a low cost. In this case, it is difficult to ensure a sufficient capacity space in front of a proximity catalyst. For this reason, the use of the exhaust manifolds integrated with the proximity catalyst greatly makes it difficult to adopt the method disclosed in Japanese Patent Provisional Publication No. 11-294157.

Further, in the two-stage combustion, almost all of the fuel injected in the additional injection transforms into heat and thus hardly contributes to the engine output. Accordingly, the fuel injected in the main injection must be increased and the fuel injected in the additional injection must be decreased accordingly as shown in FIG. 11(a) under such a condition that the load on the engine is high (e.g. while the engine is idling with a shift position of an automatic transmission being set in a D range, or while the engine is running an accessory such as an alternator and an air compressor). The decrease in the fuel injected in the additional injection makes it impossible to satisfactorily increase the temperature of the exhaust gases and accelerate the activation of the catalysts as shown in FIG. 11(b), and also deteriorates the exhaust gas performance as shown in FIG. 11(c). This imposes a restriction on the driving conditions that enable the additional injection to accelerate the warm-up of the catalysts.

As stated above, the method in which the catalysts are warmed up and activated by performing the additional injection as well as the main injection is greatly affected by the shape of the exhaust manifolds, the driving conditions and the like. Therefore, the satisfactory effects may not be achieved due to the shape of the exhaust manifolds, the driving conditions and the like.

SUMMARY OF THE INVENTION

The present invention to provide a direct injection internal combustion engine that is able to rapidly warm up and quickly activate catalysts in a more efficient manner. In a preferred embodiment, the present invention provides a direct injection internal combustion engine comprising: catalysts for purifying exhaust gases, the catalysts being disposed in an exhaust passage of the engine; a control device for controlling the engine so as to warm up or activate the catalysts when the catalysts are required to be warmed up or activated; wherein the control device includes a first control part for controlling the engine with an air-fuel ratio of the engine being set at a value in proximity to a stoichiometric air-fuel ratio, an ignition timing being set after a top dead center and a fuel injection timing being set within a compression stroke; and a second control part for controlling the engine with an air-fuel ratio of the engine being set at a value in proximity to a stoichiometric air-fuel ratio, with an ignition timing being set at a point before the top dead center and a fuel injection timing being set within a compression stroke after the first control part controls the engine.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 9(a)–(g) are time charts showing the operation of a direct injection internal combustion engine according to an embodiment of the present invention, wherein FIG. 9(a) shows the time-variations in the catalyst temperature (an alternate long and short dash line), FIG. 9(b) shows the time-variation in the CO concentration upstream catalysts (a solid line) and the time-variations in the CO concentration downstream the catalysts (an alternate long and short dash line), FIG. 9(c) shows the time-variations in the HC concentration upstream the catalysts (a solid line) and the time-variations in the HC concentration downstream the catalysts (an alternate long and short dash line), FIG. 9(d) shows the time-variations in the fuel consumption, FIG. 9(e) shows the setting of the ignition period, FIG. 9(f) shows the setting of the air-fuel ratio, and FIG. 9(g) shows the time-variations in the engine speed;

DETAILED DESCRIPTION OF THE PREFERRED EMBODIMENT

Figure 1:
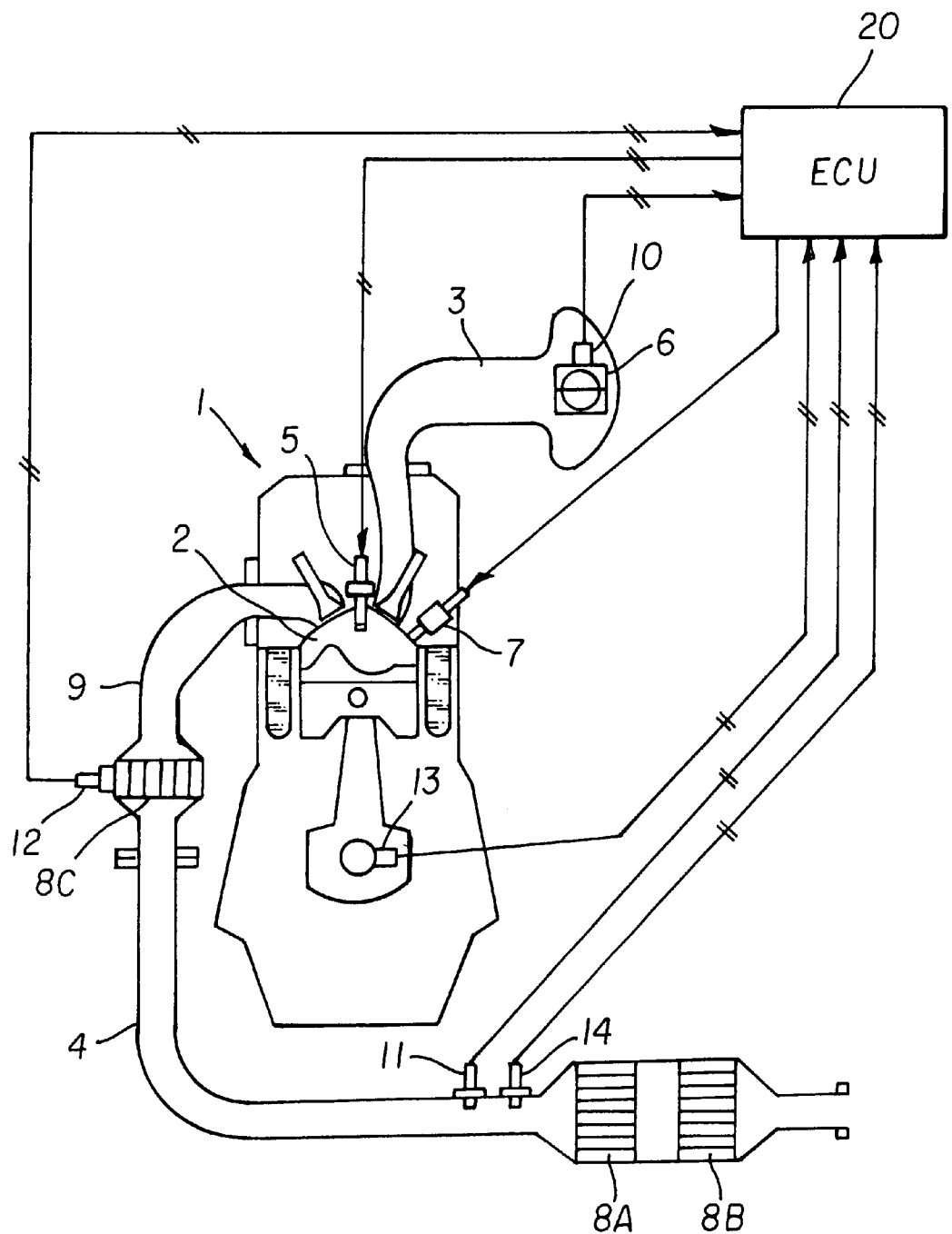
FIG. 1 is a conceptual drawing showing the structure of a direct injection internal combustion engine according to an embodiment of the present invention.

A preferred embodiment of the present invention will hereunder be described in further detail with reference to the accompanying drawings. FIGS. 1–9 show a direct injection internal combustion engine according to an embodiment of the present invention. FIG. 1 outlines the structure of the direct injection internal combustion engine according to this embodiment.

As shown in FIG. 1, the direct injection internal combustion engine (hereinafter also referred to as engine) 1 has a high-pressure injection valve (hereinafter referred to as injector) 7 at the upper side edge of a combustion chamber 2, so that the fuel can be injected directly into the combustion chamber 2. The engine 1 is capable of injecting the fuel in at least two injection modes; an intake stroke injection mode in which the fuel is injected in an intake stroke to perform a pre-mixed combustion, and a compression stroke injection mode in which the fuel is injected in a compression stroke to perform a stratified charge combustion. The engine 1 is capable of operating at a lean air-fuel ratio as well as a stoichiometric air-fuel ratio. While the engine 1 is operating at the lean air-fuel ratio, an excess air ratio can be set arbitrarily.

An ignition plug 5 is provided at the center of the top of the combustion chamber 2, and an intake passage 3 and an exhaust passage 4 connect to the top of the combustion chamber 2. The intake passage 3 connects to an intake port that is formed in a relatively upright position with respect to the combustion chamber 2. In the intake passage 3, an air cleaner (not shown) and an electronic control throttle valve (hereinafter referred to as ETV) 6 are provided in order from the upstream. An exhaust manifold 9, which collects exhaust gases emitted from the combustion chamber 2 of each cylinder into one, is connected to an exhaust port of the exhaust passage 4. A plurality of catalysts 8A to 8C having different functions is provided in the exhaust manifold 9 and at the downstream side thereof.

According to the present embodiment, a three-way catalyst 8C serving as a proximity catalyst is disposed integrally with the exhaust manifold 9, and an NOx catalyst 8A and a three-way catalyst 8B are disposed downstream the exhaust manifold 9. With this arrangement, the proximity catalyst 8C, which is disposed close to the engine 1 and is thus easily heated, purifies the exhaust gases while the NOx catalyst 8A and the three-way catalyst 8B is not sufficiently heated, for example e.g. after the start of the engine 1, and the three-way catalyst 8B purifies CO, HC and NOx in the exhaust gases at the stoichiometric air-fuel ratio after the warm-up. NOx, which is generated during the operation at the lean air-fuel ratio, is occluded by the NOx catalyst 8A that functions in oxygen-rich atmosphere. The occluded NOx is emitted from the NOx catalyst 8A in reduced atmosphere and is reduced by the three-way catalyst 8B. The NOx catalyst 8A should not necessarily be an occlusion-type catalyst but also be a selective reducing type catalyst that selectively reduces and purifies NOx in the oxygen-rich atmosphere.

A control unit 20 and a variety of sensors are provided in order to control the engine 1. The control unit 20 is provided as an electronic control unit (hereinafter referred to as ECU) that is comprised mainly of: an input/output device; storage devices (e.g. ROM, RAM and BURAM) for use in storing a control program, a control map and so forth; a central processing unit (CPU) and a timer counter (not shown). The control unit 20 sets various kinds of control signals to control the engine 1 according to information from the variety of sensors described below.

In the engine 1, a throttle sensor 10 for detecting the angle of the ETV 6 is provided at a position where the ETV 6 is disposed in the exhaust passage 3. The engine 1 is also provided with a crank angle sensor 13 for outputting signals in synchronism with the rotation of a crank shaft that is not illustrated. The ECU 20 estimates a load on the engine 1 according to the throttle angle, which is detected by the throttle sensor 10, and an engine speed calculated from an output from the crank angle sensor 13. The ECU 20 controls a fuel injection volume, a fuel injection timing and an ignition timing according to a control map (not illustrated), which is memorized in advance based on the engine speed and the estimated engine load.

An $O_2$ sensor 11, which detects the oxygen concentration of the exhaust gases, is provided upstream the NOx catalyst 8A in the exhaust passage 4. The air-fuel ratio of the engine 1 can be estimated according to an output from the $O_2$ sensor 11. The ECU 20 is able to execute an open loop control for regulating the fuel injection volume according to the air volume and an $O_2$ feedback control for regulating the fuel injection volume according to the output from the $O_2$ sensor 11. The engine 1 is also provided with a catalyst temperature sensor 12, which detects the temperature of the proximity catalyst 8C (a bed temperature of the proximity catalyst 8C). Further, an exhaust temperature sensor 14, which detects the exhaust temperature, is disposed next to the $O_2$ sensor 11 upstream the NOx catalyst 8A.

There will now be described a principal part of the direct injection internal combustion engine according to the present invention. The object of the present invention is to rapidly warm up and quickly activate the catalysts 8A–8C without performing the two-stage combustion in which an additional combustion as well as a main combustion is performed to warm up and activate the catalysts.

Figure 2:
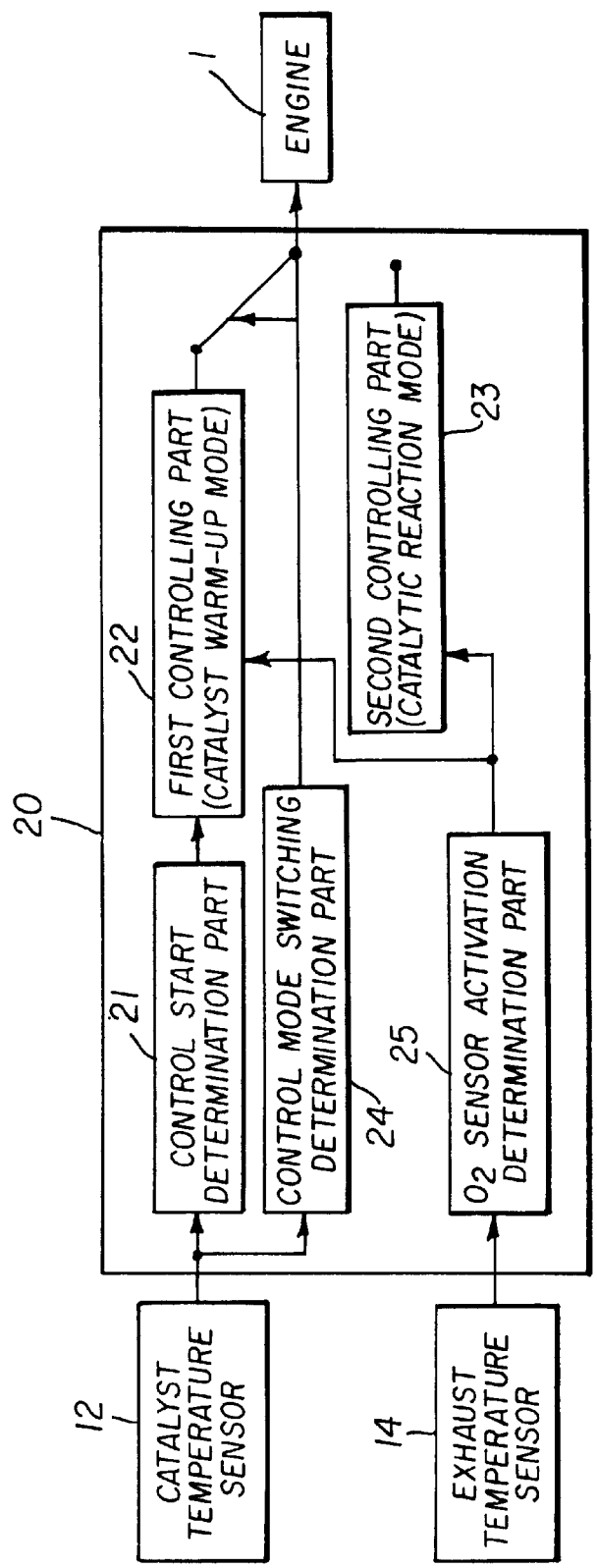
FIG. 2 is a functional block diagram showing the functions of a principal part of a direct injection internal combustion engine according to an embodiment of the present invention.
Figure 3:
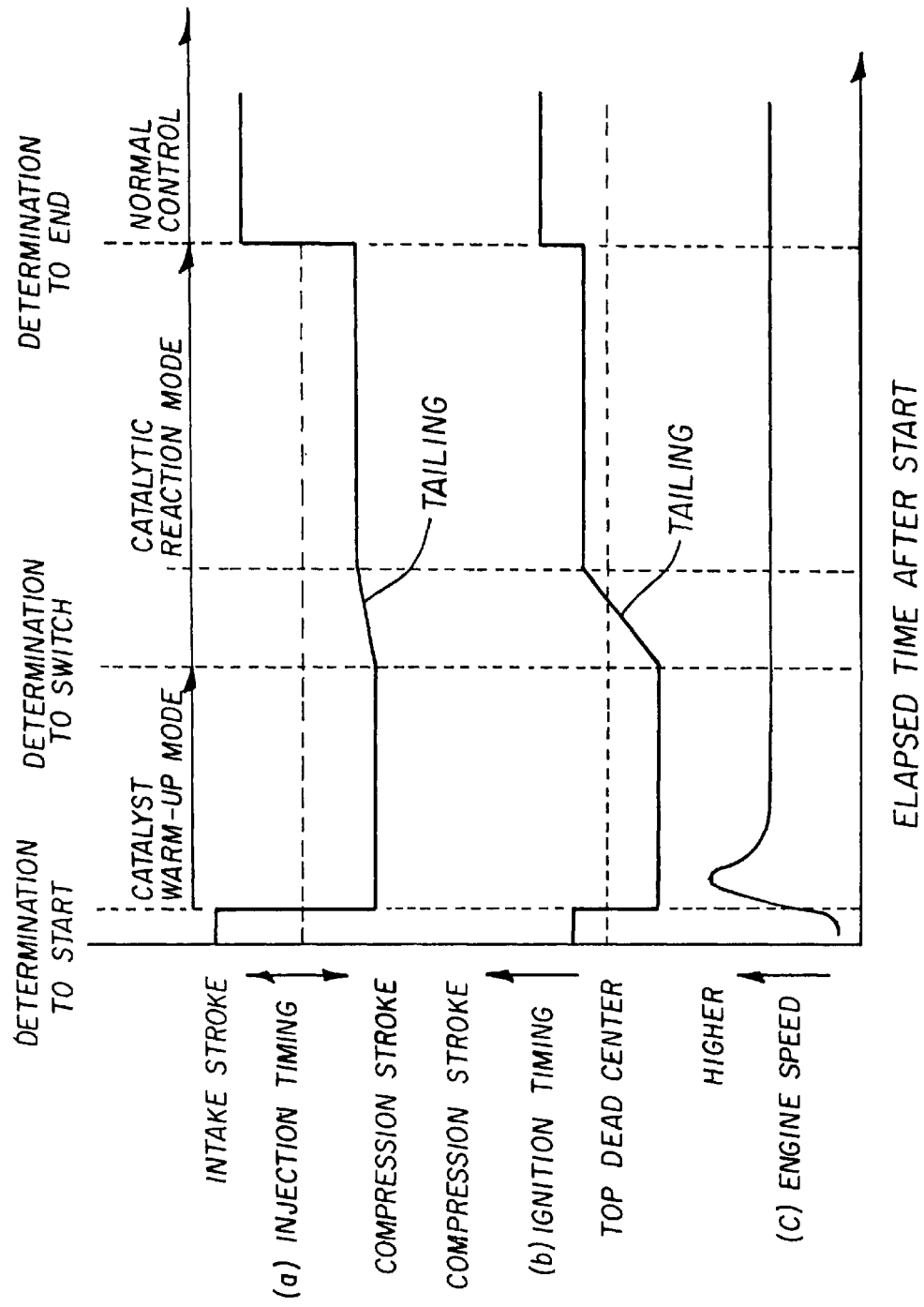
FIG. 3 is a time chart showing a control characteristic in relation to a direct injection internal combustion engine according to an embodiment of the present invention.

FIG. 2 is a block diagram showing the functions of the principal part of the direct injection internal combustion engine according to the present invention. As shown in FIG. 2, the ECU 20 has as its functional components a control start determination part 21, a first control part 22, a second control part 23, a control mode switching determination part 24 and an $O_2$ sense activation determination part 25. The cooperation of the functional components 21–25 achieves the above object.

The control start determination part 21 has a function of determining whether to start executing a controlling operation for warming up and activating the catalysts 8A–8C (by the first control part 22 or the second control part 23 described later). The catalysts 8A–8C are activated at least when they reach the minimum activation temperature. If the catalysts 8A–8C are activated to only a small degree, they cannot function effectively. To reduce the generation of unburned HC, the degree to which the catalysts 8A–8C are activated is increased so that they can function effectively. Particularly, the proximity catalyst 8C must be activated quickly. Accordingly, the control start determination part 21 determines to start executing the controlling operation for activating the proximity catalyst 8C when a catalyst temperature $T_C$ is lower than a predetermined temperature (a catalyst sufficiently-activating temperature) at which the proximity catalyst 8C is determined as being activated sufficiently. The temperature of the proximity catalyst 8C should not necessarily be detected by the catalyst temperature sensor 12. For example, the temperature of the proximity catalyst 8C may be estimated according to the temperature of cooling water in the engine 1 and the elapsed time indicated by a timer after the start of the engine, or the temperature of the proximity catalyst 8C may be estimated according to the exhaust temperature detected by the exhaust temperature sensor 14. The first controlling operation is preferably switched to the second controlling operation if the catalyst temperature exceeds the first predetermined temperature (e.g. the minimum catalyst activation temperature).

The first control part 22 and the second control part 23 are the functional components that control the fuel injection volume (the air-fuel ratio), the fuel injection timing and the ignition timing. When the control start determination part 21 determines to start executing the controlling operation for warming up the catalysts, the first control part 22 sets the air-fuel ratio, the fuel injection timing and the ignition timing as described below so as to control the injector 7 and the ignition plug 5. A control mode in which the first control part 22 executes the controlling operation will hereinafter be referred to as a catalyst warm-up mode:

1) the air-fuel ratio—in proximity to the stoichiometric air-fuel ratio [more preferably, slightly leaner than the stoichiometric air-fuel ratio (for example, the excess air ratio is between 1.0 and 1.2)];

2) the fuel injection timing—in the compression stroke; and 3) the ignition timing—after a top dead center (that is, in an expansion stroke from a point in proximity to a top dead center to a point after the top dead center).

In this control mode executed by first control part 22, the fuel injection end timing is preferably set within the range from 70° BTDC to 20° BTDC and the ignition timing is preferably set within the range from a point in proximity to TDC to about 20° ATDC. In the catalyst warm-up mode, the ignition timing is set at a point after the top dead center so as to ensure an interval between the fuel injection timing and the ignition timing; however, the fuel injection timing may be earlier so as to ensure the interval between the fuel injection timing and the ignition timing.

When the later-described control mode switching determination part 24 determines to switch the control mode, the second control part 23 operates instead of the first control part 22. The second control part 23 sets the fuel injection timing and the ignition timing as described below so as to control the injector 7 and the ignition plug 5. A control mode in which the second control part 23 performs the controlling operation will hereinafter be referred to as a catalytic reaction mode:

1) the air-fuel ratio—in proximity to the stoichiometric air-fuel ratio [more preferably, slightly leaner than the stoichiometric air-fuel ratio (for example, the excess air ratio is between 1.0 and 1.2)]

2) the fuel injection timing—in the compression stroke (an injection end timing is set prior to the start of the catalyst warm-up mode)
3) the ignition timing—within the range from a point before a top dead center to the top dead center (that is, in the compression stroke from a point before a top dead center to a point in proximity to the top dead center).

In this control mode executed by second control part 23, the fuel injection end timing is preferably set within the range from 80° BTDC to 40° BTDC and the ignition timing is preferably set within the range from about 20° BTDC to a point in proximity to TDC. If the ignition timing in the control mode executed by the first control part 22 is set at a point in proximity to TDC, the ignition timing in the control mode executed by the second control part 23 is preferably advanced from TDC (the control mode executed by the first control part 22) to be set within the range from 20° BTDC to 10° BTDC. Namely, the ignition timing of the second control part 23 is advanced predetermined time from the ignition timing of the first control part 22. For example, the ignition timing of the second control part 23 sets within the range from 20° BTDC to 10° BTDC. Further, if the ignition timing in the control mode executed by the first control part 22 is set within the range from 5° ATDC to 20° ATDC, the ignition timing in the control mode executed by the second control part 23 can be selected appropriately within the range from 20° BTDC to a point in proximity to TDC in consideration of the combustion stability and the exhaust gas contents concentration.

In the catalytic reaction mode, however, the injection timing and the ignition timing are not changed step by step from the those in the catalyst warm-up mode, but they are gradually changed by tailing control as shown in FIGS. 3(a) and 3(b) in every step or with the use of the timer.

The first control part 22 and the second control part 23 open-loop control the air-fuel ratio (i.e. controls the fuel injection volume) until the later-described $O_2$ sensor activation determination part 25 determines that the $O_2$ sensor 11 has been activated.

When the $O_2$ sensor 11 is determined as being activated, the first control part 22 and the second control part 23 feedback-control the air-fuel ratio according to an output value of the $O_2$ sensor 11.

The control mode switching determination part 24 is a functional component that determines to switch a subject of the controlling operation from the first control part 22 (the catalyst warm-up mode) to the second control part 23 (the catalytic reaction mode) as stated above. When the catalyst temperature $T_C$ detected by the catalyst temperature sensor 12 becomes equal to or higher than a minimum temperature (the catalyst activation determination temperature) $T_{C1}$ ($T_{C0}$) at which the proximity catalyst 8C is determined as being activated, the control mode switching determination part 24 determines to switch the control mode from the catalyst warm-up mode to the catalytic reaction mode. When the catalyst temperature $T_C$ detected by the catalyst temperature sensor 12 becomes equal to or higher than the sufficient activation temperature $T_{C0}$, the second control part 23 finishes the controlling operation so that the normal controlling operation can start according to the control map. The temperature of the proximity catalyst 8C should not necessarily be detected by the catalyst temperature sensor 12. For example, whether the control mode should not switched or not is determined by estimating the temperature of the proximity catalyst 8C according to the temperature of the cooling water in the engine 1 and the elapsed time indicated by the timer after the start of the engine 1 or according to the exhaust temperature detected by the exhaust temperature sensor 14.

The $O_2$ sensor activation determination part 25 is a functional component that determines whether the $O_2$ sensor 11 is activated or not in the above-mentioned manner. The $O_2$ sensor 11 cannot exert its function or accurately execute the feedback control when the temperature thereof is not greater than a predetermined temperature (an activation temperature). The present invention solves this problem as follows. The $O_2$ sensor activation determination part 25 determines whether the $O_2$ sensor 11 is activated or not and allows the first control part 22 and the second control part 34 to execute the feedback control only when the when the temperature thereof is activated. The $O_2$ sensor activation determination part 25 estimates the inner temperature of the $O_2$ sensor 11 according to the exhaust temperature detected by the exhaust temperature sensor 14 and determines the $O_2$ sensor 11 as being activated when the inner temperature of the $O_2$ sensor 11 exceeds the activation temperature.

Figure 4:
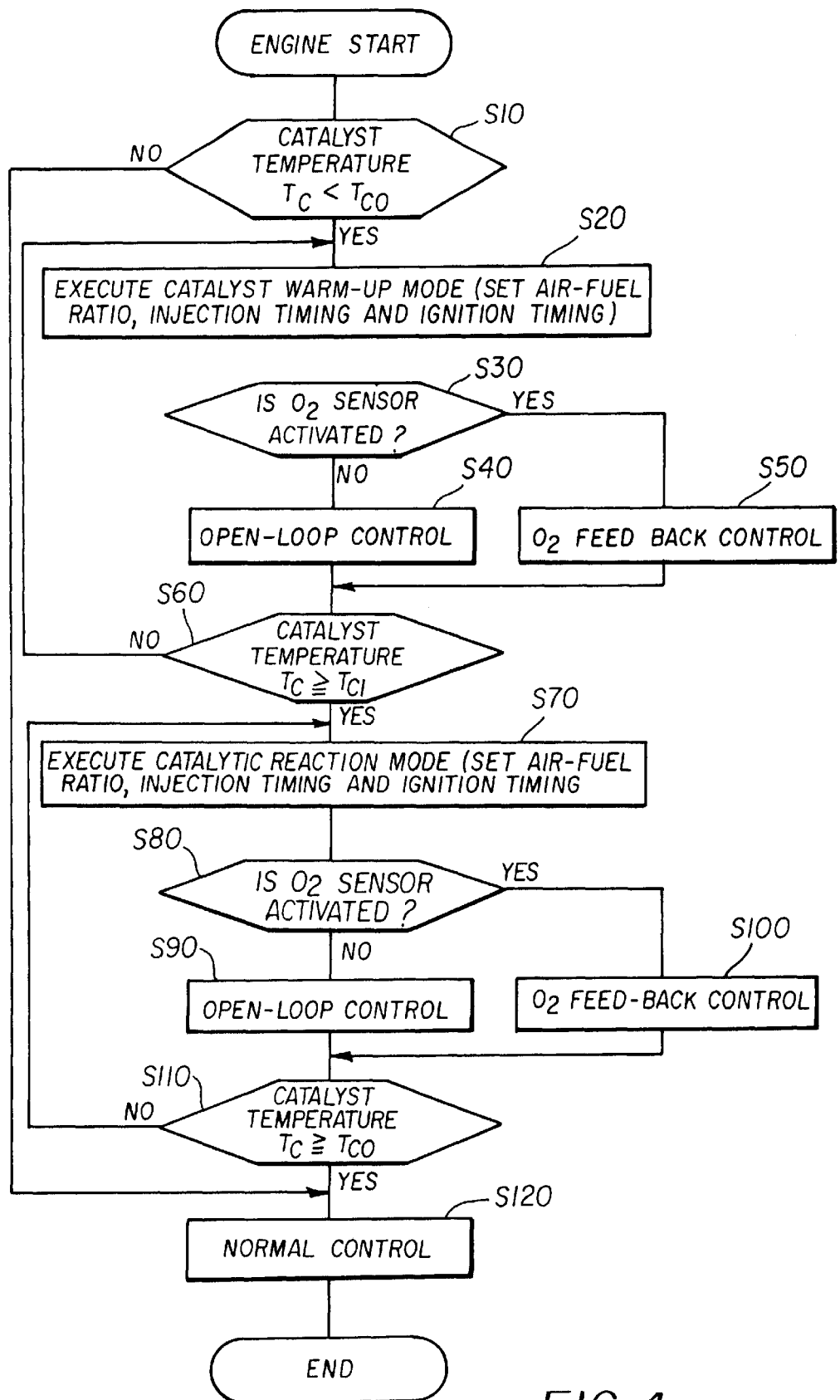
FIG. 4 is a flow charts in explaining the operation of a direct injection internal combustion engine according to an embodiment of the present invention.
Figure 5:
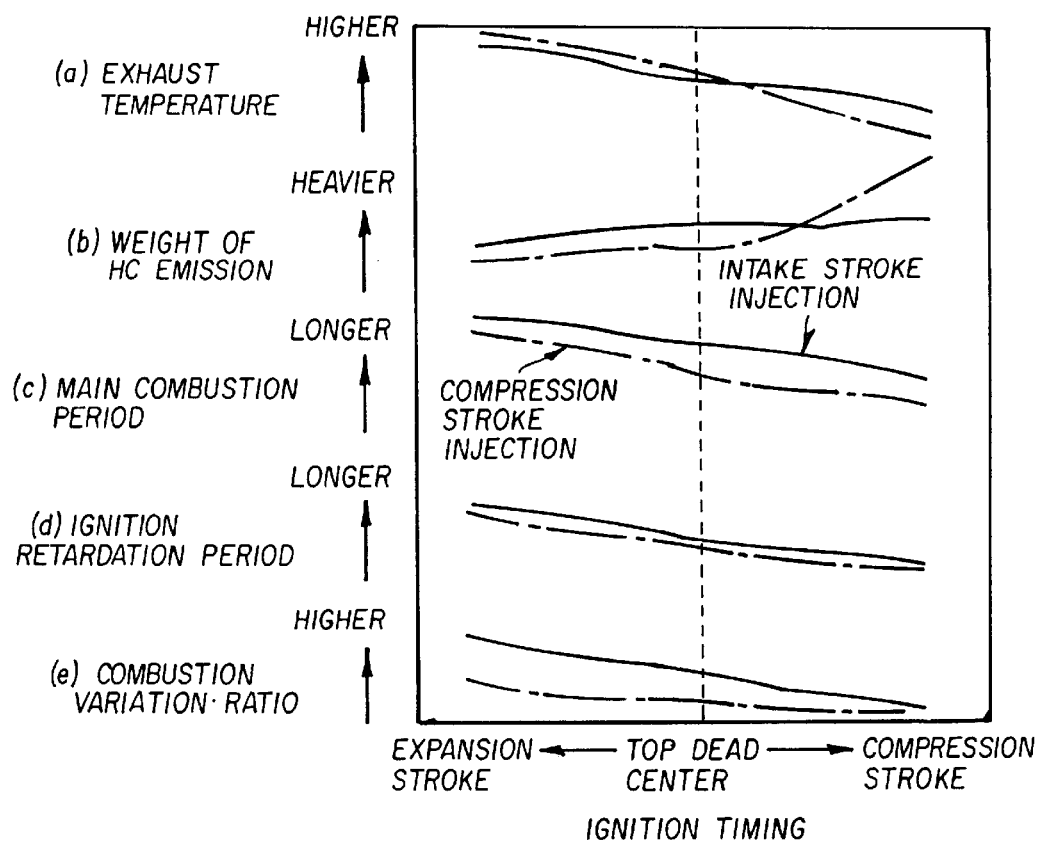
FIG. 5 is a chart showing the comparison of the exhaust temperature (a), the HC emission weight (b), the main combustion period (c), the ignition retardation time (d) and the combustion variation ratio (e) between a compression stroke injection (an alternate long and short dash line) and an intake stroke injection (a solid line) in various ignition timings at a stoichiometric air-fuel ratio.
Figure 6:
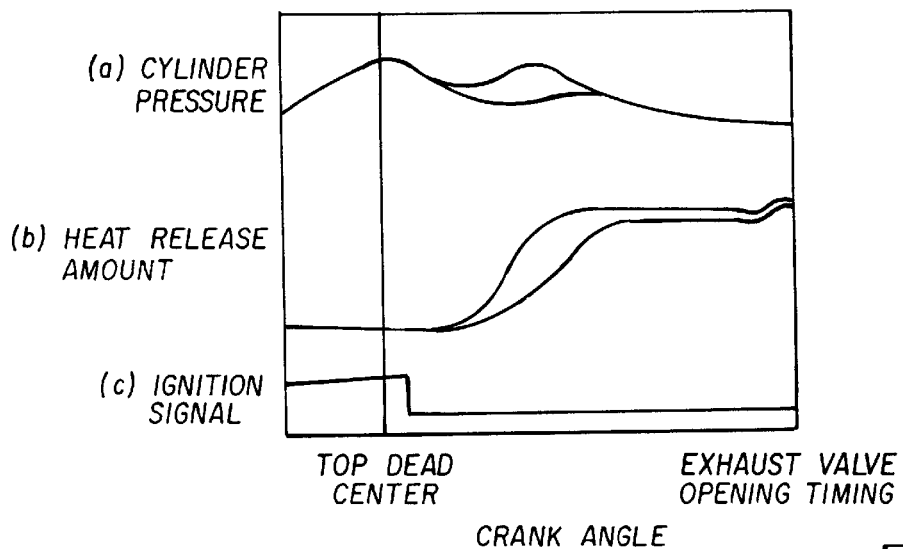
FIG. 6 is a time chart showing the time-variations in the cylinder pressure (a), the heat release amount (b) and the ignition signal (c) in the case where the ignition timing is set at a point after a top dead center in a compression stroke injection performed at the stoichiometric air-fuel ratio while the engine is idling.

FIG. 4 is a flow chart (steps S10–S120) showing a controlling process executed by the ECU 20 (the control start determinations part 21, the first control part 22, the second control part 23, the control mode switching determination part 24 and the $O_2$ sensor activation determination part 25. This controlling process aims at warming up the catalysts just after the start of the engine 1.

First, it is determined in a step S10 whether the catalyst temperature $T_C$ detected by the catalyst temperature sensor 12 is lower than the sufficient activation temperature $T_{C0}$ or not. If the catalyst temperature $T_C$ detected by the catalyst temperature sensor 12 has already reached the sufficient activation temperature $T_{C0}$ or higher, the process goes to a step S120 to perform a normal controlling operation. That is, the engine 1 is operated according to the map that is stored in advance.

If it is determined in the step S10 that the catalyst temperature $T_C$ detected by the catalyst temperature sensor 12 is lower than the sufficient activation temperature $T_{C0}$, the process goes to a step S20 to execute the catalyst warm-up mode. More specifically, the air-fuel ratio is set at a value in proximity to the stoichiometric air-fuel ratio [more preferably, a slightly lean air-fuel ratio (for example, the excess air ratio is between 1.0 and 1.2)]. The fuel injection timing is set within the compression stroke and the ignition timing is set at a point after the top dead center. In a next step S30, whether the $O_2$ sensor 11 is activated or not is determined according to the exhaust temperature detected by the exhaust temperature sensor 14. If the $O_2$ sensor 11 is not activated, the process goes to a step S40 so as to open-loop control the air-fuel ratio and control the ignition timing. If the $O_2$ sensor 11 is activated, the process goes to a step S50 to feedback-control the air-fuel ratio and control the ignition timing.

In a step S60, it is determined whether the catalyst temperature $T_C$ detected by the catalyst temperature sensor 12 has reached the predetermined catalyst activation determination temperature $T_{c1}$ or not. The controlling operation in the steps S20–S60, that is, the controlling operation in the catalyst warm-up mode is repeated until the catalyst temperature $T_C$ reaches the predetermined catalyst activation determination temperature $T_{C1}$. When catalyst temperature $T_C$ reaches the catalyst activation determination temperature $T_{C1}$, the process goes to a step S70 to switch the control mode from the catalyst warm-up mode to the catalytic reaction mode.

In the step S70, the catalytic reaction mode is executed so that a tailing control makes the injection end timing being earlier than that in the catalyst warm-up mode and changes the ignition timing to a point before the top dead center. To change the fuel injection end timing and the ignition timing in the catalyst warm-up mode to those in the catalytic reaction mode, the tailing control is executed so as to gradually change the fuel ignition timing and gradually change the ignition timing in accompaniment with (or in synchronism with) the change in the fuel injection end timing as shown in FIGS. 3(a) and 3(b). In a step S80, whether the $O_2$ sensor 11 is activated or not is determined according to the exhaust temperature. If the $O_2$ sensor 11 is not activated, the process goes to a step S90 to open-loop control the air-fuel ratio and control the ignition timing. If the $O_2$ sensor 11 is activated, the process goes to a step S100 to feedback-control the air-fuel ratio and control the ignition timing.

In a step S110, it is determined whether the catalyst temperature $T_C$ detected by the catalyst temperature sensor 12 has reached the sufficient activation temperature $T_{C0}$ or not. The controlling operation in the steps S70–S100, that is, the controlling operation in the catalyst warm-up mode is repeated until the catalyst temperature $T_C$ reaches the sufficient activation temperature $T_{C0}$. When the catalyst temperature $T_C$ reaches the sufficient activation temperature $T_{C0}$, the process goes to a step S120 to cancel the catalytic reaction mode so that the engine 1 can be controlled according to the control map that is stored in advance.

Referring next to FIGS. 5–9, there will be described the operation of the direct injection internal combustion engine according to the present invention that is constructed in the above-mentioned manner.

First, a description will be given of the operation resulting from the execution of the catalyst warm-up mode.

To activate the proximity catalyst 8C, it can be considered that the exhaust gases a large amount of CO and $O_2$ are supplied to the proximity catalyst 8C so that the heat of the catalytic reaction between CO and $O_2$ can raise the temperature of the proximity catalyst 8C. To trigger the catalytic reaction, however, the temperature of the proximity catalyst 8C must be the minimum activation temperature or higher. If the temperature of the proximity catalyst 8C is lower than the minimum activation temperature, the temperature there of must be raised quickly.

In the catalyst warm-up mode, the fuel is injected in the compression stroke wherein the fuel injected directly from the injector 7 stratifies a charge of a rich fuel mixture and a charge of a rich fuel mixture locally in the combustion chamber 2. Therefore, as shown in FIGS. 5(c) and (d), the mixture in the combustion chamber 2, which is ignited by the ignition plug 5, burns at an extremely high speed compared with the premixed combustion that is carried out by injecting the fuel in the intake stroke (a stratified charge combustion).

Since the mixture burns at a higher speed in the compression stroke injection than in the intake injection stroke as stated above, the burning state is stable and the engine 1 never misfires even if the ignition timing is retarded to a point after the top dead center as shown in FIG. 5(e) and FIGS. 6(a)–(b). As a result, the concentration of the unburned HC emission can be controlled to be lower than in the intake stroke injection as shown in FIG. 5(b). The retardation of the ignition timing to a point after the top dead center results in such an extreme after-burning that the heat continues releasing until an exhaust valve is opened as shown in FIGS. 6(a)–6(b). Consequently, the exhaust temperature rises as is the case with the intake stroke injection (about 700° C.)

Therefore, the execution of the catalyst warm-up mode prevents the generation of the unburned HC and enables the supply of the high-temperature exhaust gases to the proximity catalyst 8C so that the temperature of the proximity catalyst 8C can quickly rise to the minimum activation temperature (see FIGS. 9(a) and 9(c)).

Figure 7:
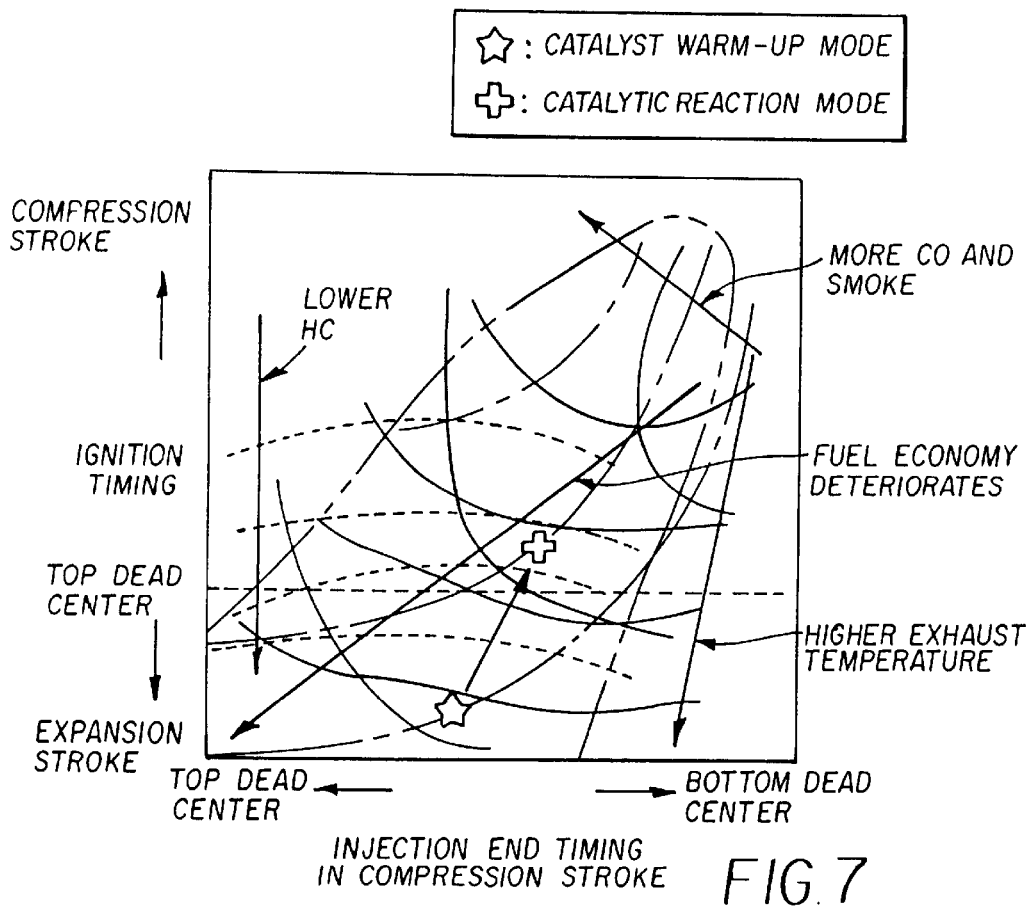
FIG. 7 is a chart showing the relationship between the exhaust temperature (a thick solid line), the HC emission concentration (a broken line), the concentration of CO and smokes (an alternate long and short dash line) and the fuel economy (a thin solid line) in the case where the air-fuel ratio is set at a slightly lean air-fuel ratio with the engine speed and the load being constant, wherein an alternate long and two short dash line indicates a region where a stable combustion can be realized.

It should be noted that the compression stroke injection causes the rich fuel mixture to be formed locally as stated above, and thus, the concentration of the smoke and CO emission when the air-fuel ratio is in proximity to the stoichiometric air-fuel ratio. In the catalyst warm-up mode, however, a sufficient interval between the fuel injection and the ignition is ensured by retarding the ignition timing to a point after the top dead center, and this facilitates the mixture of the injected fuel and the air. Therefore, the concentration of the smoke and CO emission is controlled to be low as shown in FIG. 7 and FIG. 9(b).

Figure 8:
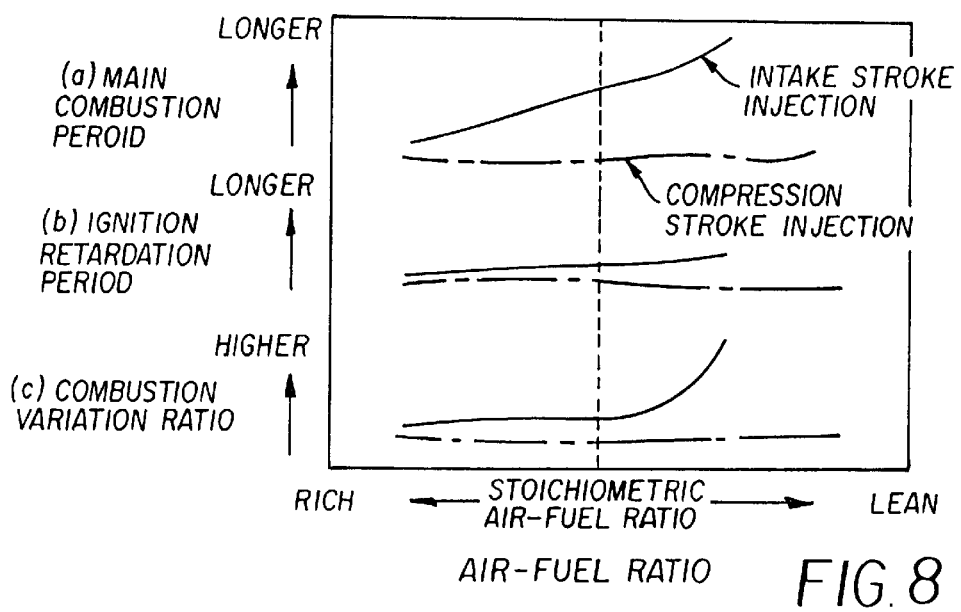
FIG. 8 is a chart showing the comparison of the main combustion period (a), the ignition retardation time (b) and the combustion variation ratio (c) between in a compression stroke injection (an alternate long and short dash line) and in an intake stroke injection (a solid line) at various air-fuel ratios under the condition that the engine speed and the load are constant and the ignition timing is set at a point after the top dead center.
Figure 9:
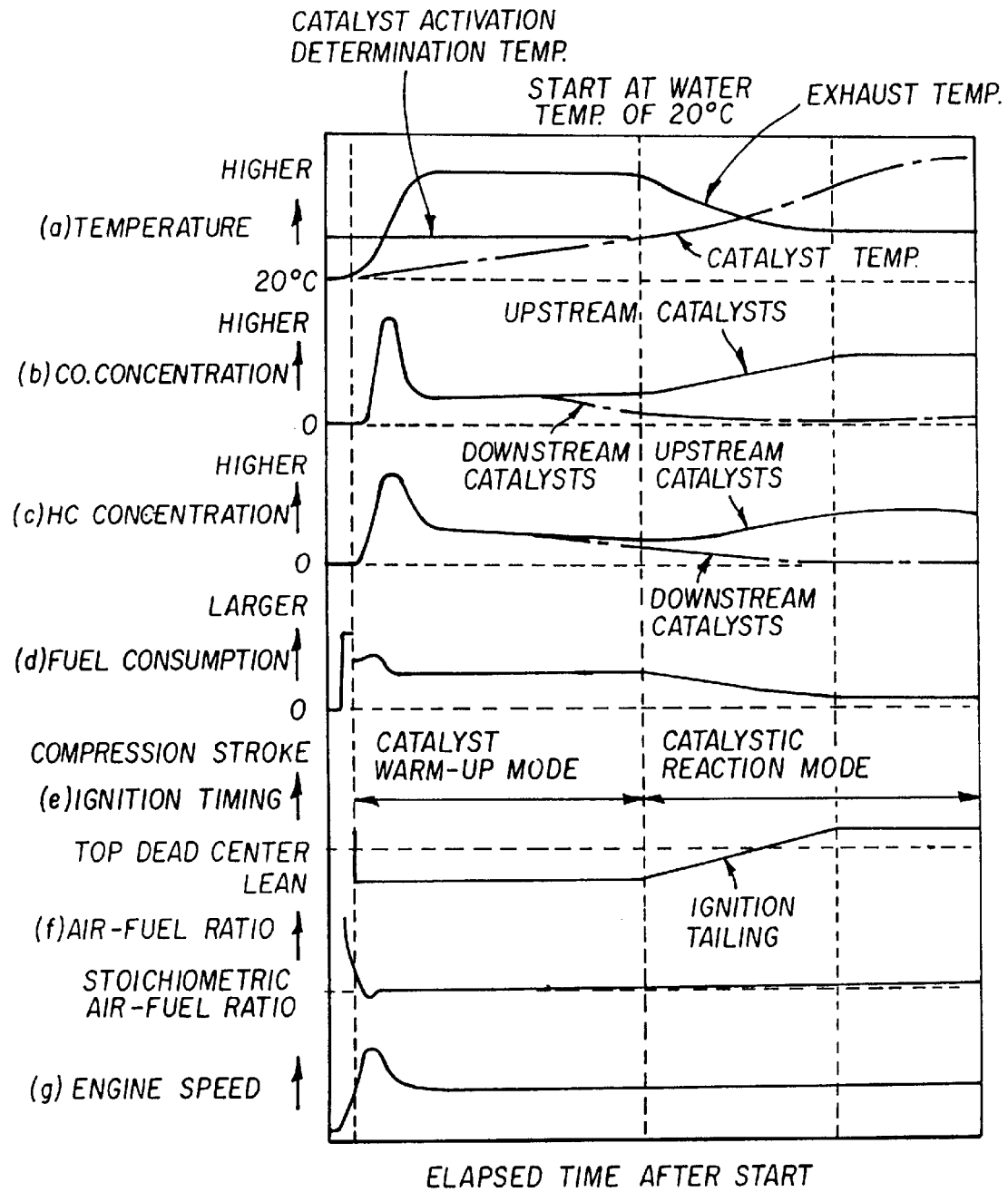
Figure 10:
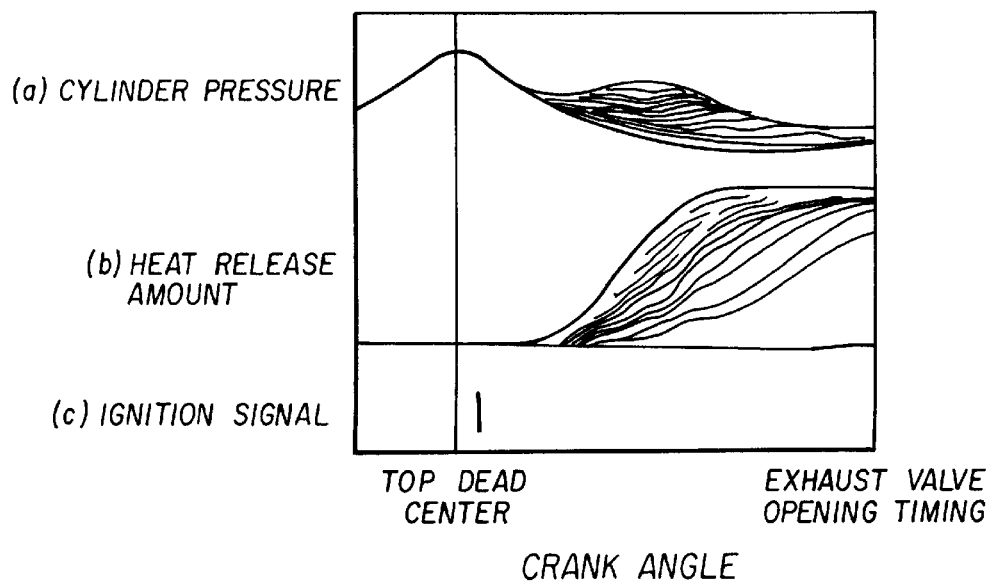
FIG. 10 is a time chart of assistance in explaining the conventional problem and shows the time-variations in the cylinder pressure (a), the heat release amount (b) and the ignition signal (c) in the case where the ignition timing is set after a top dead center in an intake stroke injection performed at a stoichiometric air-fuel ratio while the engine is idling.
Figure 11:
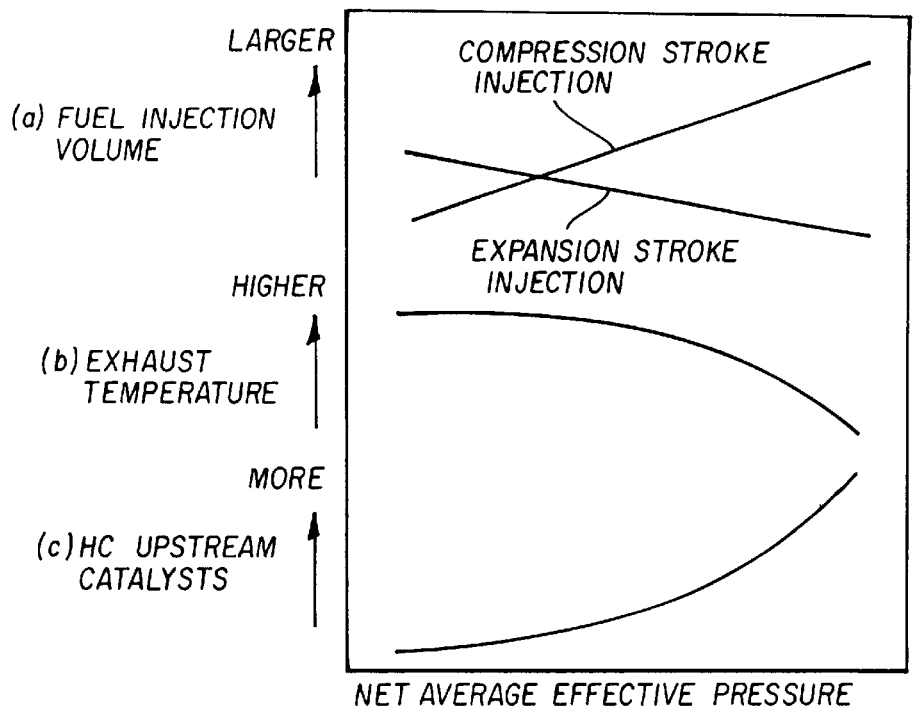
FIG. 11 is a chart of assistance in explaining the conventional problem and shows the variations in the fuel injection volume in a compression stroke injection (a solid line) where a two-stage combustion is performed at various net average pressures (loads) under the condition that the engine speed, the load and the excess air ratio are constant, and the variations in the fuel injection volume (a), the exhaust temperature (b) and the HC concentration (c) upstream catalysts in an expansion stroke injection (an alternate long and short dash line).

The catalyst warm-up mode is executed by the open-loop control until the $O_2$ sensor 11 is activated. Thus, as shown in FIG. 8, the burning state never deteriorates as in the case of the pre-mixed combustion even if the air-fuel ratio greatly shifts to a leaner ratio, because the stratified charge combustion based on the compression stroke injection is less sensitive to the change in the air-fuel ratio than the pre-mixed combustion.

Moreover, the maximum combustion pressure representative of an engine exiting force is lower than the compression pressure and the variation in the cylinder pressure is small as shown in FIG. 6(a) as in case where the engine 1 is idling just after starting. This reduces the vibrations of the engine 1.

There will now be described the operation resulting from the execution of the catalytic reaction mode.

As stated above, the execution of the catalyst warm-up mode enables the temperature of the proximity catalyst 8C to quickly rise to the minimum activation temperature. In the catalyst warm-up mode, however, the fuel economy cannot always be desirable because a large amount of fuel transforms into heat without contributing to the engine output although the exhaust temperature can be raised. To address this problem, the ignition timing is advanced from a point after the top dead center to a point before the top dead center by the tailing control in the catalytic warm-up mode as shown in FIG. 9(e) so that the fuel economy can be improved as shown in FIG. 7 and FIG. 9(d).

This improvement in the fuel economy lowers the exhaust temperature as shown in FIG. 7 and FIG. 9(a). The concentration of the unburned HC emission increases with the decrease in the exhaust temperature as shown in FIG. 7 and FIG. 9(c). Due to the characteristics of the stratified charge combustion, the injected fuel and the air stop mixing when the ignition timing becomes close to the fuel injection timing. This increases the concentration of the CO emission as shown in FIG. 7 and FIG. 9(b).

The temperature of the proximity catalyst 8C, however, has already reached the minimum activation temperature (the catalyst activation determination temperature) due to the execution of the catalyst reaction mode, and thus the catalytic reaction between CO and $O_2$ occurs on the catalysts and the heat of the reaction further increases the catalyst temperature as shown in FIG. 9(a). The increase in the catalyst temperature accelerates the activation of the proximity catalyst 8C. Therefore, even if the concentration of the CO and HC emission from the engine 1 is increased as stated above, the concentration of the CO and HC emission can be reduced to an extremely low level as shown in FIGS. 9(b)–9(c).

As set forth above, the direct injection internal combustion engine of the present invention can achieve the following advantageous effects. The stable after-burning and the high exhaust temperature are achieved by injecting the fuel in the compression stoke at the stoichiometric air-fuel ratio and setting the ignition timing at a point after the top dead center. This makes it possible to efficiently warm up the proximity catalyst 8C while suppressing the emission of the unburned HC.

Moreover, when the temperature of the proximity catalyst 8C reaches the catalyst activation determination temperature, the ignition timing is changed to a point before the top dead center so that CO and $O_2$ can coexist in the exhaust gases and react on the proximity catalyst 8C. The heat of the reaction further warms up the proximity catalyst 8C and accelerates the activation of the proximity catalyst 8C while preventing the deterioration of the fuel economy.

Further, according to the direct injection internal combustion engine of the present invention, the above-mentioned effects can be achieved without depending on the shape of the exhaust manifolds or the driving conditions. In addition, the cost should never be increased since it is unnecessary to use any additional devices such as a secondary air system.

The above description relates to one embodiment of the direct injection internal combustion engine. It should be understood, however, that there is no intention to limit the invention to the embodiments disclosed, but on the contrary, the invention is to cover all modifications within the spirit and scope of the invention. For example, according to the above embodiment, the proximity catalyst (the three-way catalyst) 8C is provided in proximity to the engine 1, but it is needless to say that the proximity catalyst 8C can be omitted. If the proximity catalyst 8C is omitted, the NOx catalyst 8A and the three-way catalyst 8B provided downstream the exhaust passage are warmed up and quickly activated instead of the proximity catalyst 8C. Moreover, the object of the prevent invention is to warm up and quickly activate the catalysts, and there is no limitation on the kinds and number of catalysts.

According to the above embodiment, the timing for switching the control mode from the catalyst warm-up mode to the catalyst reaction mode is determined according to whether or not the catalyst temperature $T_C$ detected by the catalyst temperature sensor 12 has reached the catalyst activation determination temperature $T_{C1}$, but may also be determined according to the elapsed time indicated by the timer. More specifically, upon the start of the engine 1, a catalyst warm-up mode admission timer starts measuring the elapsed time (timer ON) and the catalyst warm-up mode is started. When the timer indicates a predetermined elapsed time t1, the catalyst warm-up mode is finished (timer OFF). When the catalyst warm-up mode is ended, a catalytic reaction mode admission timer starts measuring the elapsed time (timer ON) and the catalytic reaction mode is started. When the timer indicates a predetermined elapsed time t2, the catalyst warm-up mode is finished (timer OFF) to perform the normal controlling operation. Optimum values are previously found in advance with respect to the predetermined elapsed times t1 and t2 by conducting an experiment, etc. Alternatively, the temperature of the cooling water, etc. may be stored in a map in advance so that the predetermined elapsed times t1 and t2 may be determined according to the temperature of the cooling water when the engine is started.

In the above embodiment, the present invention is applied to warm up the catalysts after the start of the engine, but the present invention should not be restricted to this. For example, if the engine is left idling for a long period of time after the catalysts are activated, the temperature of the exhaust gases is lowered to inactivate the catalysts. The present invention may be applied to this kind of situation wherein the catalysts are inactivated and needs to be warmed up again. For example, if the temperature of the activated catalysts becomes equal to or lower than the catalyst activation determination temperature $T_{C1}$, the second control part 23 may be controlled to perform the controlling operation. Further, if the temperature of the catalyst having been activated becomes not greater than a predetermined HC or NO activation temperature although it is not less than a predetermined CO activation temperature, the second controller 23 is controlled to perform the controlling operation. If the catalyst temperature becomes equal to or lower than the CO activation temperature (in this case, the catalyst cannot be expected to be warmed up by CO oxidization), the second control part 23 performs the controlling operation after the first control part 22 performs the controlling operation.

In the above embodiment, the air-fuel ratios of the first control part 22 and the second control part 23 are set at the stoichiometric air-fuel ratio or the slightly lean air-fuel ratio that is slightly leaner than the stoichiometric air-fuel ratio, but the present invention should not be restricted to this. For example, the air-ratios of the first control part 22 and the second control part 23 may be slightly richer than the stoichiometric air-fuel ratio. Alternatively, the air-fuel ratio of the first control part 22 may be set at a slightly richer air-fuel ratio than the stoichiometric air-fuel ratio so as to accelerate the warm-up of the catalysts, and the air-fuel ratio of the second control part 23 then may be set at the slightly lean air-fuel ratio so as to reduce the fuel consumption.

What is claimed is:

1. A direct injection internal combustion engine comprising:
   catalysts for purifying exhaust gases, said catalysts being disposed in an exhaust passage of said engine;
   a control device for controlling said engine so as to warm up or activate said catalysts when said catalysts are required to be warmed up or activated;
   wherein said control device includes:
      a first control pan for controlling said engine with an air-fuel ratio of said engine being set at a value in proximity to a stoichiometric air-fuel ratio, an ignition timing being set a point after the top dead center and a fuel injection timing being set only within a compression stoke; and
      a second control part for controlling said engine with an air-fuel ratio of said engine being set at a value in proximity to a stoichiometric air-fuel ratio, with an ignition timing being set a point before the top dead center and a fuel injection timing being set only within a compression stroke after said first control part controls said engine,
      wherein said control device causes a second fuel injection end timing set by said second control tart to be earlier than a first fuel injection end timing set by said first control part.

2. A direct injection internal combustion engine according to claim 1 wherein said control device causes an ignition timing of said second control part to be advanced by a predetermined time from an ignition timing set by said first control part.

3. A direct injection internal combustion engine according to claim 1, wherein said control device switches a controlling operation from a controlling operation performed by said first control pan to a controlling operation performed by a second control part when a temperature of said catalysts exceeds a first predetermined temperature or if said first control part has already performed the controlling operation for a first predetermined period of time.

4. A direct injection internal combustion engine according to claim 3, wherein said control device causes said second control part to finish the controlling operation when a temperature of said catalysts exceeds a second predetermined temperature higher than said first predetermined temperature or if said second control part has already controlled said engine for a second predetermined period of time.

5. A direct injection internal combustion engine according to claim 1, wherein when switching the controlling operation from the controlling operation performed by said first control part to the controlling operation performed by said second control part, said control device gradually changes an ignition timing from an ignition timing that is set at a point after the top dead center by said first control part to an ignition timing that is set at a point before the top dead center by said second control part.

6. A direct injection internal combustion engine according to claim 5, wherein when switching the controlling operation from the controlling operation performed by said first control part to the controlling operation performed by said second control part, said control device gradually changes the ignition timing from a first ignition timing that is set at a point after the top dead center by said first control part to a second ignition timing that is set at a point before the top dead center by said second control part, and also gradually changes the ignition timing in accompaniment with the change in the fuel injection timing.

7. A method of controlling a direct injection internal combustion engine, which comprises catalysts for purifying exhaust gases, said catalysts being disposed in an exhaust passage of said engine, said method comprising the steps of:
   determining whether or not said catalysts are required to be warmed up or activated;
   controlling said engine so as to warm up said catalysts with an air-fuel ratio of said engine being at a value in proximity to a stoichiometric air-fuel ratio, an ignition dining being set a point after the top dead center and a fuel injection timing being set within a compression stroke, if it is determined that said catalysts are required to be warmed up or activated; and
   after warming up said catalysts, controlling said engine to accelerate a catalytic reaction of said catalysts with an air-fuel ratio of said engine being set at a value in proximity to a stoichiometric air-fuel ratio, an ignition timing being set a point before the top dead center and a fuel injection timing being set within a compression stroke;
   wherein when an oxygen sensor for sensing an oxygen concentration in exhaust gases is activated during a controlling operation for warming up said catalysts or accelerating said catalytic reaction, an air-fuel ratio of said engine is feedback-controlled in accordance with an output from said oxygen sensor, and the air-fuel ratio of said engine is open-loop controlled until said oxygen sensor is activated.

8. A method of controlling a direct injection internal combustion engine according to claim 7, further comprising:
   determining whether a temperature of said catalysts exceeds a first predetermined temperature or whether said catalysts have already been warmed up for a first predetermined period of time; and
   switching a controlling operation from a controlling operation for warming up said catalysts to a controlling operation for accelerating said catalytic reaction when the temperature of said catalysts exceeds said first predetermined temperature or if said catalysts have already been warmed up for said first predetermined period of time.

9. A method of controlling a direct injection internal combustion engine according to claim 7, wherein when switching a controlling operation from a controlling operation for warming up said catalysts to a controlling operation for accelerating said catalytic reaction, an ignition timing is gradually changed from an ignition period that is set at a point after the top dead center in the controlling operation for warming up said catalysts to an ignition period that is set at a point before the top dead center in the controlling operation for accelerating said catalytic reaction.

10. A method of controlling a direct injection internal combustion engine according to claim 7, further comprising:
   determining whether a temperature of said catalysts exceeds a second predetermined temperature higher than said first predetermined temperature or whether said catalytic reaction has already been carried out for a second predetermined period of time; and
   finishing a controlling operation for accelerating said catalytic reaction of when the temperature of said catalysis exceeds said second predetermined temperature or if said catalytic reaction has already been carried out for said second predetermined period of time.

11. A direct injection internal combustion engine comprising:
   catalysts for purifying exhaust gases, said catalysts being disposed in an exhaust passage of said engine;
   a control device for controlling said engine so as to warn up or activate said catalysts when said catalysts are required to be warmed up or activated;
   wherein said control device includes:
      a first control part for controlling said engine with an air-fret ratio of said engine being set at a value in proximity to a stoichiometric air-fuel ratio, an ignition timing being set a point after the top dead center and a fuel injection timing being set within a compression stroke; and
      a second control part for controlling said engine with an air-fuel ratio of said engine being set at a value in proximity to a stoichiometric air-fuel ratio, with an ignition timing being set a point before the top dead center and a fuel injection timing being set within a compression stroke after said first control part controls said engine; and
   wherein when an oxygen sensor for sensing an oxygen concentration in exhaust gases is activated while said first control part or said second control part is performing a controlling operation, said control device feedback-controls an air-fuel ratio of said engine in accordance with an output from said oxygen sensor.

12. A direct injection internal combustion engine comprising:
   catalysts for purifying exhaust gases, said catalysts being disposed in an exhaust passage of said engine;
   a control device for controlling said engine so as to warm up or activate said catalysts when said catalysts are requited to be warmed up or activated;

wherein said control device includes:
- a first control part for controlling said engine with an air-fuel ratio of said engine being set at a value in proximity to a stoichiometric air-fuel ratio, an ignition timing being set a point after the top dead center and a fuel in timing being set within a compression stroke; and
- a second control part for controlling said engine with an air-fuel ratio of said engine being set at a value in proximity to a stoichiometric air-fuel ratio, with an ignition timing being set a point before the top dead center and a fuel injection timing being set within a compression stroke after said first control part controls said engine; and
- wherein said control device open-loop controls an air-fuel ratio of said engine until an oxygen sensor for sensing an oxygen concentration in exhaust gases is determined as being activated while said first control part or said second control part is performing a controlling operation.

13. A direct injection internal combustion engine comprising:

catalysts for purifying exhaust gases, said catalysts being disposed in an exhaust passage of said engine;

a control device for controlling said engine so as to warm up or activate said catalysts when said catalysts are required to be warmed up or activated;

wherein said control device includes:
- a first control part for controlling said engine with an air-fuel ratio of said engine being set at a value in proximity to a stoichiometric air-fuel ratio, an ignition timing being set a point after the top dead center and a fuel injection timing being set only within a compression stroke;
- a second control part for controlling said engine with an air-fuel ratio of said engine being swat a value in proximity to a stoichiometric air-fuel ratio, with an ignition timing being set a point before the top dead center and a fuel injection timing being set only within a compression stroke after said first control part controls said engine,
- wherein said control device causes said first control part and said second control part to performing a controlling operation when said catalysts are required to be warmed up or activated and a load on said engine is high.

* * * * *